United States Patent
Johansson et al.

(10) Patent No.: US 10,157,362 B1
(45) Date of Patent: Dec. 18, 2018

(54) SYSTEMS AND METHODS FOR DELIVERING ITEMS

(71) Applicant: AMAZON TECHNOLOGIES, INC., Reno, NV (US)

(72) Inventors: Jesper Mikael Johansson, Redmond, WA (US); Shalini Pothuru, Seattle, WA (US); Brad Ruppert, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 924 days.

(21) Appl. No.: 14/108,086

(22) Filed: Dec. 16, 2013

(51) Int. Cl.
*G06Q 20/00* (2012.01)
*G06Q 10/08* (2012.01)
*G06Q 30/06* (2012.01)

(52) U.S. Cl.
CPC ....... *G06Q 10/083* (2013.01); *G06Q 30/0633* (2013.01)

(58) Field of Classification Search
CPC ......... G06Q 10/00; G06Q 30/00; G06Q 30/06
USPC ................................. 705/7, 28, 65
See application file for complete search history.

(56) References Cited

U.S. PATENT DOCUMENTS

| | | | |
|---|---|---|---|
| 2003/0105704 A1* | 6/2003 | Sundel | G06Q 10/0831 705/37 |
| 2003/0144800 A1* | 7/2003 | Davis | B07C 1/00 702/22 |
| 2005/0149413 A1* | 7/2005 | Amling | G06Q 10/08 705/28 |
| 2009/0043617 A1* | 2/2009 | Thomas | G06Q 10/00 705/28 |
| 2015/0073587 A1* | 3/2015 | Vliet | B65B 59/00 700/216 |
| 2015/0088307 A1* | 3/2015 | Ackerman | G06Q 10/087 700/241 |

* cited by examiner

*Primary Examiner* — Rokib Masud
(74) *Attorney, Agent, or Firm* — Lindauer Law, PLLC (57) ABSTRACT

Many people acquire items such as souvenirs when travelling. This disclosure describes systems and methods for shipping items acquired while travelling. In one implementation, an item is dropped off and a description of the item is provided. The item is delivered to a fulfillment center. A fulfillment center computing system may inspect the item by verifying that the description of the item corresponds to the item. By inspecting the item, the fulfillment center computing system may perform additional services, such as processing a tax refund incurred when item was purchased.

20 Claims, 6 Drawing Sheets

SYSTEMS AND METHODS FOR DELIVERING ITEMS

BACKGROUND

Many people acquire items such as souvenirs when travelling. Issues may arise while travelling with the acquired items. For example, when travelling across international borders, the rules for carrying the acquired items may be difficult to understand or follow. In addition, if traveling by plane, packing the items in bags may be challenging due to limited space, and airline fees may be relatively expensive to transport the acquired items.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

When traveling, transporting acquired items such as souvenirs may present various problems. For example, rules for bringing the items across borders may be difficult to understand or follow. When traveling by plane, packing the items in bags may be challenging due to limited space, and airline fees may be relatively expensive to transport the acquired items.

This disclosure describes systems and methods for improving the shipping process for items acquired by people while traveling. The items may comprise various articles such as souvenirs purchased while on vacation. As discussed in more detail below, a user may place the item in a locker system and specify a delivery location for the item. The item is removed from the locker system and delivered to a fulfillment center which processes the item. After processing, the item is then delivered from the fulfillment center to the delivery location. Once delivered to the delivery location, the user may reacquire the item.

The locker system may comprise a freestanding machine having one or more storage compartments configured for storage and safekeeping of the items. The storage compartment may comprise a chamber or cavity configured to receive one or more items from the user. The storage compartments may have a variety of different configurations and sizes. The storage compartment may be configured to change between a locked state and an unlocked state. In one example, the storage compartment includes a door and an actuator configured to lock and unlock the door.

The locker system may include a locker computing system that is in communication with the storage compartment using a network. The locker computing system may comprise one or more computing devices, which can perform functions described in this disclosure. These functions may be executed as one or more services.

The locker computing system may be configured to generate access code data comprising representative of an access code which may include characters or digits. In one example, the user operates an input device of the locker system to enter a unique identification number. The locker computing system may determine whether the unique identification number is valid. If the unique identification is valid, the locker computing system may cause the storage compartment to change from a locked state to an unlocked state. Once the storage compartment has the unlocked state, the user may access the storage compartment and place the item within the storage compartment.

The locker computing system may be configured to generate delivery data comprising information about a delivery location for the item placed in the storage compartment. The locker computing system may generate the delivery data in response to the user keying in the information using an input device (e.g., a keyboard) of the locker computing system. The fulfillment center computing system (described in more detail below) may use the delivery data to facilitate the delivery of the item to the specified delivery location. In some implementations, the delivery data comprises information about a date representative of the user's requested date for the item to be delivered to the delivery location. For example, at the locker system, the user may operate an input device (e.g., a keyboard) of the locker system and input information representing that the item be delivered to the delivery location one month from today because the user is unable to pick up the item from the delivery location until at least one month from today.

The locker computing system may be configured to receive description data comprising information about a description of the item. The description of the item may represent various information, such as a name of the item, a weight of the item, a dimension of the item, a purchase price of the item, an amount of tax paid for the item, and so forth.

The locker system may be associated with a trusted vendor. A vendor may comprise a person or entity that provides the user with access to the locker system. The trusted vendor may have consistently provided service associated with the locker system with integrity and in a responsible manner. Users may be more inclined to use a locker system associated with a trusted vendor because the user may have an increased level of confidence that the item placed within the locker system will arrive at the delivery location without any problem.

The locker system may be located at a drop-off location. The drop-off location may be any suitable location. For example, the drop-off location may be at a hotel, airport, rental car drop-off location, bus terminal, train station or in a dense setting, such as an urban area.

Once the storage compartment receives the item, the item may be delivered to the fulfillment center. The fulfillment center may comprise a warehouse, distribution center, hub or any other facility configured to process the item. In some implementations, a product distributor operates the fulfillment center. The fulfillment center may comprise a plurality of stations for processing items. A station may be described as a place within the fulfillment center equipped to perform one or more processes associated with the item.

The fulfillment center may be associated with an electronic marketplace. The electronic marketplace may comprise a virtual market for buyers and sellers implemented through the Internet or the World Wide Web. When a buyer places an order for an item using the electronic marketplace, the item may be delivered to the buyer in any corner of the globe, and by any known transportation means, including ground, sea, or air transit.

The fulfillment center computing system may be located within the fulfillment center. The fulfillment center computing system may comprise one or more computing devices, which can perform functions described in this disclosure. These functions may be executed as one or more services.

The delivery location may comprise various locations. For example, the delivery location may be any building or residence such as the residence of the user of the locker system, the residence of a friend of the user of the locker system, the office in which the user of the locker system works, another locker system, and so forth.

The fulfillment center computing system may be configured to verify that an item delivered to the fulfillment center corresponds with the description data provided by the user at the locker system. The item may correspond to the description data if the information of the description data matches or is consistent with the item. By verifying that the item corresponds to the description data, the fulfillment center computing system may perform other services such as processing value-added-tax refunds associated with items purchased across international borders.

The fulfillment center computing system may be configured to cause the item to be stored or stocked in inventory located within the fulfillment center. For example, the delivery data entered by the user at the locker system may indicate a request for the item to be delivered six months from today. Because the item is not scheduled for delivery until six months from today, the item may be stored in inventory until the item is ready for delivery.

Once the item is ready for delivery to the delivery location, the fulfillment center computing system may cause the item to be sorted to a designated location of the fulfillment center for further processing such as packaging. The item may be sorted using a conveyor belt system configured to transport the item from an inventory location to another location where the item is prepared for delivery.

The fulfillment center computing system may be configured to cause the item received from the locker system to be consolidated with another item ordered by the user of the locker system. In one example, the fulfillment center computing system displays a message to an employee at the fulfillment center, indicating a request for the first item to be consolidated with the second item. Thereafter, the employee may place the item received from the locker system and the additional item within the same container. By consolidating the items, costs associated with shipping the items may be reduced because a fewer amount of deliveries may be needed to ship the items to the delivery location.

By using the locker system and the fulfillment center computing system, users may not need to pack additionally purchased items such as souvenirs while traveling. Additionally, because the fulfillment center computing system may be configured to provide additional services such as processing tax refunds associated with internationally purchased items, the user of the system may not have to deal with potentially complicated rules and law associated with bringing items across international borders.

Figure 1:
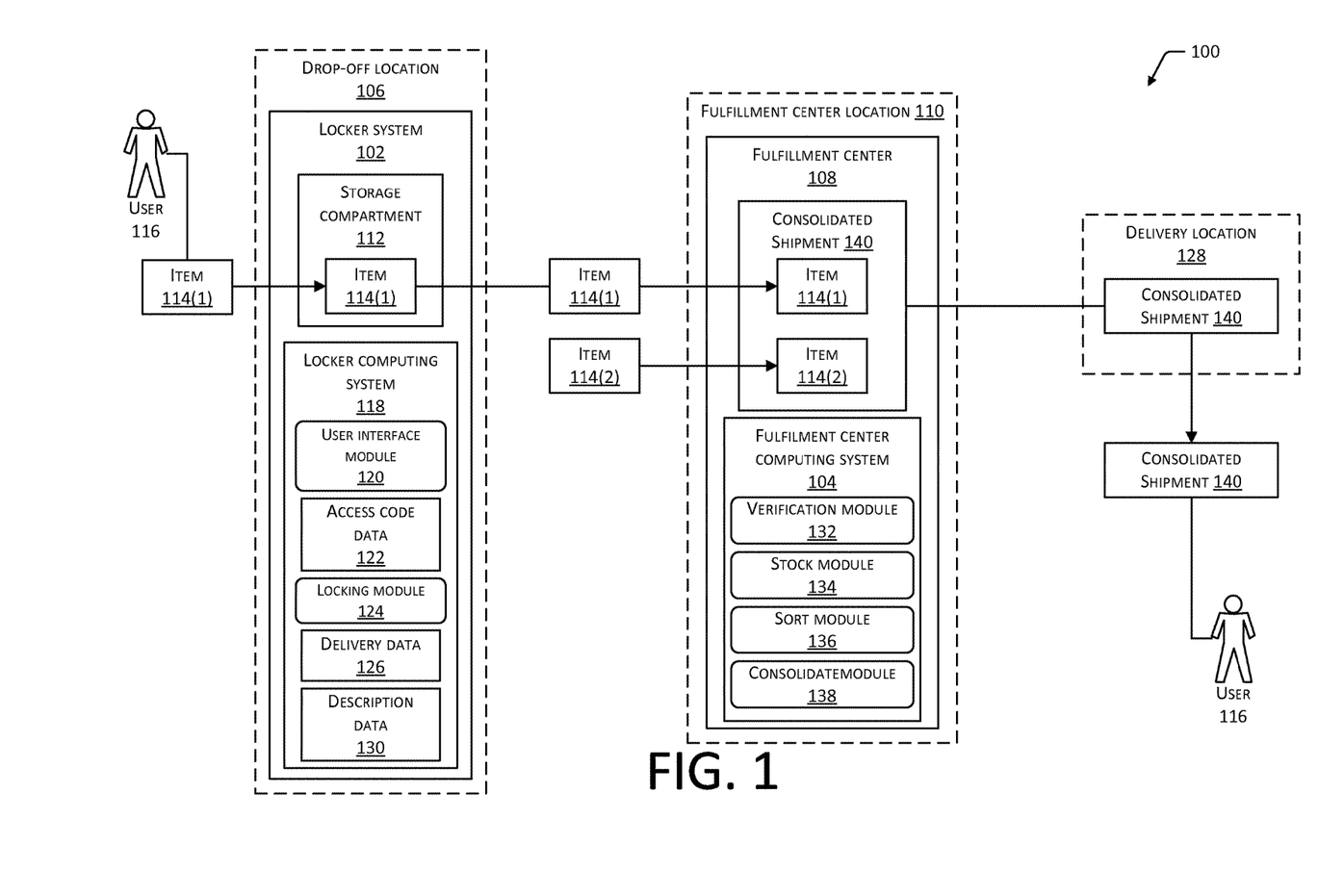
FIG. 1 is a block diagram of system for transporting an item from a drop-off location to a delivery location, illustrating the item being delivered from a locker system to a fulfillment center.

FIG. 1 is a block diagram of system 100 for transporting an item from a drop-off location to a delivery location, illustrating the item being delivered from a locker system to a fulfillment center. As discussed in more detail below, the system 100 comprises a locker system 102 and a fulfillment center computing system 104. The locker system 102 is located at a drop-off location 106, and the fulfillment center computing system 104 is located within a fulfillment center 108 located at a fulfillment center location 110.

In some implementations, the locker system 102 is communicatively connected to the fulfillment center computing system 104 using one or more networks (not shown). The network facilitating communication between the locker system 102 and the fulfillment center computing system 104 may include a variety of networks, such as a local network, a wide area network ("WAN"), broadcast network, a personal area network, a wired and wireless local area network ("LAN"), and so forth. In some implementations, the network includes at least one of Ethernet, Wi-Fi™ as promulgated by the Wi-Fi Alliance, 3G and 4G, Bluetooth® as promulgated by the Bluetooth Special Interest Group, and so forth. The devices and systems described herein may be configured to directly connect to each other. The system 100 may include additional servers which communicate with the locker system 102 and the fulfillment center computing system 104.

The locker system 102 may comprise one or more storage compartments 112 for storing and safekeeping one or more items 114. The storage compartment 112 may comprise a chamber or cavity configured to receive one or more items 114(1) from a user 116. The storage compartment 112 may have an upper, bottom, side and rear surface and at least one door configured to form a cavity in which the item 114(1) may be stored.

The storage compartments 112 may be configured to be removed or added to the locker system 102. Such a configuration supports the ability to easily and quickly expand or remove capacity so that the demand for that locker system 102 can be satisfied.

In some implementations, the storage compartment 112 is implemented as a drop-box (not shown). The drop-box may be configured to include a pivoting door or tray that allows items 114 to be place in the drop-box but not received without having additional access to the drop-box. As discussed in more detail below, the storage compartment 112 may be configured to have a locked state or an unlocked state.

The item 114 may comprise various articles such as souvenirs purchased while on vacation. In some examples, the item 114 comprises at least one of a book, apparel, jewelry, or electronics.

The locker system 102 may comprise a locker computing system 118 which may be operatively connected to the storage compartment 112. The locker computing system 118 may comprise one or more computing devices, which can perform functions described in this disclosure. These functions may be executed as one or more services.

The locker computing system 118 may include a user interface module 120 configured to provide a user interface to a user (e.g., an internal business user) using input/output devices and to accept inputs received from the input/output devices. The user interface may include one or more visual, audible, or haptic elements. For example, the user interface may be configured to provide a graphic user interface, an audible user interface, and so forth.

The user interface module 120 may enable the user 116 to provide an access code for accessing the storage compartment 112. In response to the user entering the access code, the locker computing system 118 may generate access code data 122 representative of the access code.

In some implementations, the locker computing system 118 may include a locking module 124 configured to change the storage compartment 112 between a locked state and an unlocked state. The locking module 124 may be configured to determine whether the entered access code is valid. In response to a determination that the access code is valid, the locking module 124 may change the storage compartment 112 from a locked state to an unlocked state, resulting in access to the storage compartment 112 being provided to the user 116.

The user interface module 120 may enable the user 116 to provide information used to deliver the item 114(1), such as a destination address. In response to the user 116 providing the information about delivery, the locker computing system 118 may generate delivery data 126 representative of the provided delivery information. In some implementations, the locker computing system 118 provides the delivery data 126 to the fulfillment center computing system 104 using the network. The delivery data 126 may comprise information representative of an address which the user 116 would like the item 114(1) to be delivered. In some implementations, the delivery data 126 comprises information indicative of a delivery location 128 for the item 114(1). The delivery location 128 may comprise various locations. For example, the delivery location 128 may be any building or residence such as the residence of the user 116 of the locker system 102, the residence of a friend of the user 116 of the locker system 102, the office in which the user 116 of the locker system 102 works, another locker system 102, and so forth.

In some implementations, the delivery data 126 comprises information about a date representative of the user's 116 requested date for the item 114(1) to be delivered to the delivery location 128. For example, at the locker system 102, the user 116 may input information representing that the item 114(1) be delivered to the delivery location 128 one month from today because the user 116 is unable to pick up the item 114(1) from the delivery location 128 until at least one month from today.

The user interface module 120 may enable the user 116 to provide information about a description of the item 114, including information such as a purchase price of the item 114. In response to the user 116 providing the information about the description of the item 114, the locker computing system 118 may generate description data 130 representative of the provided description. The locker computing system 118 may be configured to provide the description data 130 to the fulfillment center computing system 104.

The locker system 102 may be associated with a trusted vendor (not shown). A vendor may comprise a person or entity that provides the user 116 with access to the locker system 102. A vendor may be a trusted vendor because of consistently provided service, which may include providing service with integrity and in a responsible manner. Users 116 may be more inclined to use the locker system 102 if the locker system 102 is associated with a trusted vendor because the user 116 may have an increased level of confidence that the item 114 being handled by the locker system 102 will arrive at the delivery location 128 without any problems. A vendor may become a trusted vendor after the vendor has provided services for threshold period of time. In another example, the vendor may become a trusted vendor for an entity by executing a contract which provides indemnification to the entity.

After the locker system 102 receives the item 114(1), the item 114(1) is delivered to the fulfillment center 108. The fulfillment center 108 may comprise a warehouse, distribution center, hub or any other facility configured to process items 114. In some implementations, a product distributor operates the fulfillment center 108. The fulfillment center 108 may comprise a plurality of stations for processing the items 114. A station may be described as a place within the fulfillment center 108 equipped to perform one or more processes associated with the item 114. The fulfillment center computing system 104 may comprise one or more computing devices distributed across the stations of the fulfillment center 108 which can perform functions described in this disclosure. These functions may be executed as one or more services.

The fulfillment center computing system 104 may include a verification module 132 configured to verify that the item 114(1) corresponds with the description data 130. In some implementations, the item 114(1) corresponds to the description data 130 if the information of the description data 130 matches or is consistent with the item 114(1).

The fulfillment center computing system 104 may include a stock module 134 configured to cause the item 114(1) to be stored or stocked in inventory. For example, the stock module 134 may analyze the delivery data 126 entered in for the item 114, and determine that the item 114(1) is not scheduled for delivery for at least six months. Because the item 114(1) is not scheduled for delivery for at least six months, the item 114(1) may be stored in inventory until the item 114(1) is ready for shipment.

The fulfillment center computing system 104 may include a sort module 136 configured to cause the item 114(1) to be sorted to a designated location of the fulfillment center 108. In one example, the sort module 136 includes a conveyor belt system configured to transport the item 114(1) from an inventory location to another location where the item 114(1) is prepared for shipping.

The fulfillment center computing system 104 may include a consolidate module 138 configured to cause the item 114(1) to be consolidated with a second item 114(2). The consolidated items 114 may be referred to as a consolidated shipment 140. The item 114(2) may be ordered by the user 116 from the electronic marketplace. In one example, the item 114(2) is received from another fulfillment center 108 (not shown). In another example, the item 114(2) is received from the user 116. For example, the user 116 may place the item 114(2) in the locker system 102 or a different locker system 102 located at a different drop-off location 106 (not shown), such as when the user is traveling and visiting many locations. The item 114(2) may be ordered before or after the item 114(1) is placed in the locker system 102. In one example, the fulfillment center computing system 104 displays a message to an employee at the fulfillment center 108, indicating a request for the item 114(1) to be consolidated with the item 114(2). By consolidating the item 114(1) with the item 114(2), costs associated with shipping the items 114 may be reduced because a fewer number of separate deliveries may be needed to ship the items 114 to the delivery location 128. The item 114(1) may be consolidated with the item 114(2) by combining the item 114(1) and the item 114(2) into the same container such as the same box.

Once the items 114 are consolidated, the fulfillment center computing system 104 may initiate delivery of the consolidated shipment 140. For example, the fulfillment center computing system 104 displays a message to an employee at the fulfillment center 108, indicating the need for the consolidated shipment to be delivered. A carrier may deliver the consolidated shipment 140 to the delivery location 128.

In some implementations, the item 114(1) is not consolidated with any other items 114. In these implementations, the carrier delivers the single unconsolidated item 114 to the deliver location 128.

In some implementations, once the item 114(1) is placed in the locker system 102, at least one of the fulfillment computing system 104 or the locker computing system 118 determines which of a plurality of different fulfillment centers 108 will receive the item 114(1) placed in the locker system 102. In one example, a particular fulfillment center 108 is selected as the destination fulfillment center 108 because it is already scheduled to fulfill other orders placed by the user 116. By sending the item 114(1) to the fulfillment center 108 already handling orders for the user 116, the item 114(1) may be consolidated with the already ordered item 114, which may result in cost savings with regard to shipping. In another example, once the item 114(1) is placed in the locker system 102, the fulfillment center computing system 104 may change a particular fulfillment center 108 which is scheduled to handle an already existing order of a second item 114 to a different fulfillment center 108. The fulfillment center computing system 104 may change the fulfillment center 108 based on a cost savings analysis of the shipping associated with delivering the items 114 to the user 116. For example, the fulfillment center computing system 104 may determine that causing the fulfillment center 108 that will receive the item 114 from the locker system 102 to also fulfill the order of the second item 114 will be cheaper (e.g., in aggregate) than another fulfillment center 108 that is currently scheduled to fulfill the order. In one example, the user 116 is on vacation far from their home. The user 116 places an order of a first item 114 (e.g., toothpaste) using the electronic marketplace, and selects to have the toothpaste delivered to the user's 116 home. When the user 116 places the order, the online marketplace determines that a first fulfillment center 108 located near the user's 116 home will fulfill the order of the toothpaste. Thereafter, while on vacation far from the user's 116 home, the user 116 places a second item 114 (e.g., a souvenir) within a locker system 102, which is delivered to a second fulfillment center 108 nearby. The online marketplace may determine that the second fulfillment center 108 should handle the previous order of toothpaste, and that the toothpaste should be consolidated with the souvenir for shipping because such an arrangement would reduce shipping costs associated with delivering the toothpaste and the souvenir to the user's 116 home.

In some implementations, once the item 114(1) is placed in the locker system 102, at least one of the fulfillment center computing system 104 or the locker computing system 118 determines which of a plurality of different storage facilities (not shown) will receive the item 114(1) placed in the locker system 102. For example, the user 116 may be on a long business trip (e.g., more than 1 month), and the user 116 may purchase several souvenirs over the period of the trip. The user 116 may place the items 114 within the locker system 102 as the user 116 purchases the items 114, and the items 114 may be held at a storage facility until after the user 116 arrives back home from the business trip. At the storage facility, the one or more items 114 may be consolidated with other items (e.g., toothpaste, soap, pantry items, such as soda, groceries, and so forth) which may have been ordered by the user 116. The storage facility may be determined based on storage costs, transportation costs, anticipated future orders of the user 116, and so forth.

The fulfillment center computing system 104 may be configured to determine cost savings by comparing costs to deliver the items using different delivery processes. The costs may be determined by querying one or more shipping databases which store information about shipping rates. The costs may be determined based on the weight of the individual items 114 and the consolidated shipment 140. The costs may be determined based on the way the item 114 is delivered. For example, the costs may be determined based on whether the item 114 or consolidated shipment 140 would be delivered via ground shipment or air transport.

In some implementations, based on these cost calculations, at least one of the locker system 102 or the fulfillment center computing system 104 may offer different shipping options. For example, at least one of the locker system 102 or the fulfillment center computing system 104 may determine that a cheaper shipping option may be implemented if the user 116 purchases one or more items 114. These one or more items 114 may be presented to the user 116 at the locker system 102, giving the user 116 the option to purchase the one or more items 114.

In some implementations, the locker system 102 may provide recommendations about which locker system 102 may be used to reduce costs associated with shipping. For example, the user 116 may be on an extended vacation and traveling to multiple different locations while vacationing. These multiple locations may be represented by travel itinerary information. The locker system 102 may use the travel itinerary information to provide recommendations on which locker system 102 to use, which may reduce the cost of shipping the item 114.

Figure 2:
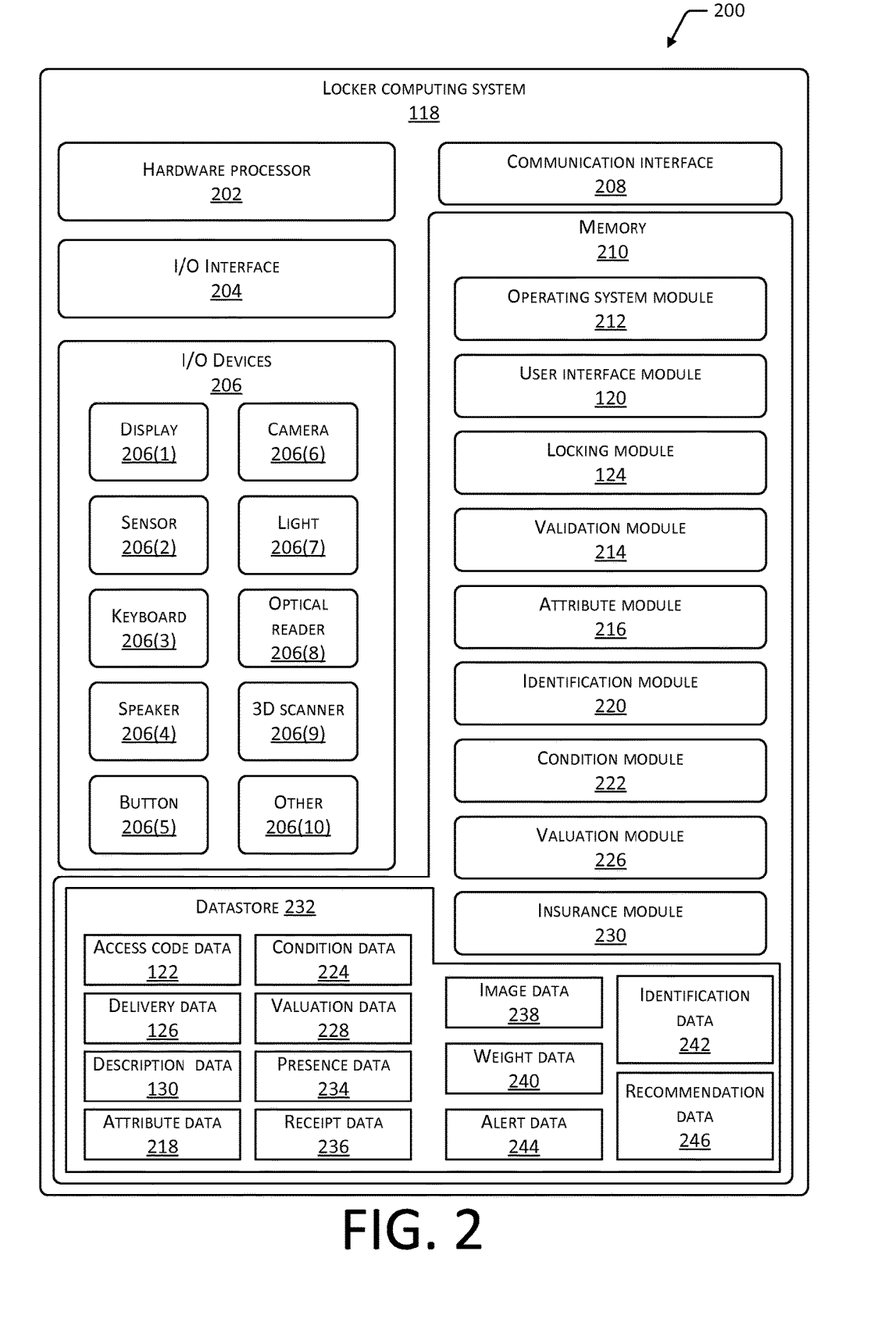
FIG. 2 is a block diagram of the locker computing system configured to perform various services associated with the item.

FIG. 2 is a block diagram 200 of the locker computing system 118 configured to perform various services associated with the item 114. The locker computing system 118 may include at least one hardware processor 202 configured to execute stored instructions. The at least one hardware processor 202 (or "processor") may comprise one or more cores.

The locker computing system 118 includes at least one input/output ("I/O") interface 204 which enables portions of the locker computing system 118 (e.g., the hardware processor 202) to communicate with other devices. The I/O interface 204 may be configured to implement any number of protocols, such as inter-integrated circuit ("I2C"), serial peripheral interface bus ("SPI"), Universal Serial Bus ("USB"), RS-232, HDMI, TOSLINK, Bluetooth®, and so forth. The at least one I/O interface 204 may be operatively connected to at least one I/O device 206. In some implementations, certain I/O devices 206 are physically incorporated with the locker computing system 118 or externally placed.

The at least one I/O device 206 may include one or more devices such as a display 206(1), a sensor 206(2), a keyboard 206(3), a speaker 206(4), a button 206(5), a camera 206(6), a light 206(7), an optical reader 206(8), a three-dimensional ("3D") scanner 206(9), or other devices 206(10).

In some implementations, the sensor 206(2) comprises a particulate sensor to detect hazardous substances (e.g., explosives) or banned substances (e.g., illegal drugs). The particulate sensor may comprise a forced air ejection component and an air intake component. The air ejection component may expel air from a first side of the storage compartment 112. Opposite the air ejection component, the air intake component may collect the ejected air and any particulates that are collected as the air passes over the item 114. The locker computing system 118 may scan or otherwise process the collected particulates to determine whether the item 114 includes a potentially hazardous or banned substance using any known particulate testing technique. If particulates indicating the potential presence of hazardous or banned substances are detected, the locker computing system 118 may alert the authorities, or take other protective actions (e.g., shutting down the locker system 102 or performing additional tests).

The sensor 206(2) may comprise a proximity sensor configured to indicate whether the item 114 is proximate to the storage compartment 112. The proximity sensor may include optical proximity sensors, capacitive proximity sensors, acoustic proximity sensors, near field communication ("NFC") tag readers, radio frequency identification ("RFID") tag readers, and so forth.

In some implementations, the locker computing system 118 uses the camera 206(6) to determine the presence or absence of items 114 within the storage compartment 112. For example, after the camera 206(6) acquires an image of the inside of the storage compartment 112, the locker computing system 118 may determine whether the item 114 has been placed within the storage compartment 112 based on an analysis of the acquired image.

The optical reader 206(8) may be configured to read, scan, or otherwise evaluate any optically readable representations of data that may be included within, attached to, or otherwise affixed on the item 114. Such representations may include a receipt, a standard bar code, a "quick response" (or "QR") code, or any written or printed letters, numbers, or other characters that may be located on one or more internal or external surfaces of the item 114. The light 206(7) may be configured to illuminate the inside of the storage compartment 112.

The 3D scanner 206(9) may be configured to acquire data about the item's 114 shape. The 3D scanner 206(9) may use optical, acoustic, or direct physical measurement to characterize the external boundaries of the object. In one implementation the 3D scanner 206(9) may utilize one or more of a range camera, 3D vision system, laser scanner, sonar, and so forth. The 3D scanner 206(9) may be equipped with additional sensors to provide information about the weight of the item 114. The information collected by the 3D scanner 206(9) may be used to determine which size container or box should be used to package the item 114. In some implementations, the other device 206(10) includes a credit card reader configured to enable the user 116 to make payments using a credit card. The other device 206(10) may also include a money slot. The locker computing system 118 may operate with the money slot to receive money (e.g., paper money or coins) associated with services provided by the locker computing system 118. In another example, the other devices 206(10) may include a vending slot. The locker computing system 118 may operate with the vending slot to vend things such as stamps, labels, envelopes, shipping packages, and so forth. The other devices 206(10) may include a scale. The scale may include one or more measuring instruments such as balances, spring scales, digital scales, or any other components that are adapted to determine or estimate a mass or weight of the item 114. As discussed in more detail below, the mass or weight of the item 114 may be used by the locker computing system 118 to identify the item 114.

The locker computing system 118 may include at least one communication interface 208. The communication interface 208 may be configured to provide communications between the locker computing system 118 and other devices, such as the fulfillment center computing system 104, routers, access points, servers, other locker computing systems 118, and so forth. The communication interface 208 may connect to the network.

The locker computing system 118 may include at least one bus or other internal communications hardware or software that enables for the transfer of data between the various modules and components of the locker computing system 118.

As illustrated in FIG. 2, the locker computing system 118 may include at least one memory or memory device 210. The memory 210 may include at least one non-transitory computer-readable storage media ("CRSM"). The CRSM may include at least one of an electronic storage medium, a magnetic storage medium, an optical storage medium, a quantum storage medium, or a mechanical computer storage medium. The memory 210 may include computer readable instructions, data structures, program modules, and other data for the operation of the locker computing system 118.

The memory 210 may include at least one operating system ("OS") module 212. The OS module 212 may be configured to manage hardware resources such the I/O interface 204, the I/O devices 206, the communication interface 208, and provide various services to applications or modules executing on the hardware processor 202. The memory 210 may also store at least one of the following modules which may be executed as foreground applications, background tasks, daemons, and so forth.

In some implementations, the user interface module 120 is configured to provide a user interface to the user 116 using the I/O devices 206 and to accept inputs received from the I/O devices 206. The user interface may include one or more visual, audible, or haptic elements. For example, the user interface may be configured to provide a graphic user interface, an audible user interface, and so forth.

The memory 210 may include the locking module 124 which may be configured to cause the storage compartment 112 to change between a locked state and an unlocked state. The storage compartment 112 may include a door (not shown) and a locking mechanism (not shown) configured to lock and unlock the door. The locking module 124 may be configured to cause the locking mechanism to lock and unlock the door in response to a determination that an access code entered by the user 116 is valid. The locking mechanism may comprise pins configured to move between an extended position which causes the door to have the locked state, and a retracted position which causes the door to have the unlocked state. The locking mechanism may comprise any mechanical, electrical, or magnetic locking mechanism.

The memory 210 may include a validation module 214 configured to validate the access code input by the user 116. Once the access code is validated, the locking module 124 may be configured to cause the storage compartment 112 to change from a locked state to an unlocked state.

The memory 210 may include an attribute module 216 configured to generate attribute data 218. The attribute data 218 may comprise information about a quality or characteristic of the item 114. The information about the quality or characteristic of the item 114 may include at least one of: a mass or weight of the item 114; a dimension of the item 114 (e.g., a length, a height, or a width of the item 114); a condition of the item 114 (which may be expressed in qualitative or quantitative terms); or a label or identifier for the item 114, such as a cover or optically readable marking on, or affixed to, the item 114, including a book cover or binding, or the digits of an International Standard Book Number (ISBN), a Universal Product Code (UPC), a stock keeping unit (SKU) identifier, a model number, or a bar code indicative of such a number. The locker computing system 118 may use the I/O devices 206 to determine the attribute data 218.

The memory 210 may include an identification module 220 configured to identify the item 114. In some implementations, the identification module 220 identifies the item 114 by analyzing the attribute data 218. For example, the item 114 may comprise a book that has been inserted into the storage compartment 112. The locker computing system 118 may acquire an image of the book, and the acquired image may be analyzed to determine that the image includes characters (e.g., letters or numbers) or readable symbols (e.g., bar codes). The characters or readable symbols may be compared to a list or other registry of authors, titles, publication dates, editions, versions, ISBNs, or any other identifying information in order to determine or confirm the identity of the book. Moreover, an identity and/or a condition of the item 114 may be confirmed based on multiple attributes. For example, where the word "civil" is recognized from a cover of a book, and a mass of the book is determined to be approximately 320 grams, the book may be confirmed to be a paperback copy of A Civil Action (1995), by Jonathan Haar, which has a consistent mass, and not either a hardcover version of The Civil War: A Narrative (1986), by Shelby Foote, which has a mass of approximately 1.14 kilograms, or a softbound copy of Federal Rules of Civil Procedure (2012), which has a mass of approximately 400 grams, which share the word "civil" in their respective titles, but have substantially different masses.

The memory 210 may include a condition module 222 configured to generate condition data 224 comprising information about a condition associated with the item 114. The condition may comprise information about the quality of the item 114. The condition module 222 may generate the condition data 224 by comparing an image of the item 114 acquired at the locker system 102 and a reference image of the item 114. The reference image may comprise an image of the item 114 in an original, pristine, or new condition. By comparing the image of the item 114 with the reference image, the condition module 222 may determine differences in colors, shapes, or other features expressed in the images. The condition may be expressed as one of the following quality gradings: new, unused, mint in box, like new, excellent, good, fair, bargain grade, and poor.

The memory 210 may include a valuation module 226 configured to generate valuation data 228 comprising information about a value of the item 114. The value may be determined based on a depreciation of a baseline price of the item 114 in its pristine condition, or based on the coherence or any differences. In another example, the value may be determined based upon a receipt indicating the purchase price of the item 114.

The memory 210 may include an insurance module 230 configured to offer insurance to the user 116. The insurance may comprise a contract in which an entity associated with the locker system 102 agrees to indemnify or reimburse the user 116 for loss that occurs under the terms of the contract. The insurance module 230 may determine the terms of the contract based on the condition of the item 114. The user 116 may review the terms and either accept or decline the offer. In some implementations, the insurance module 230 may be configured to offer to add the item 114 to the user's 116 homeowner's or renter's insurance. In one example, the insurance module 230 generates an inventory of items owned by the user 116, and the insurance module 230 enables the user 116 to add one or more items to the user's 116 homeowner's or renter's insurance.

In some implementations, the memory 210 includes a datastore 232 for storing information. The datastore 232 may use a flat file, database, linked list, tree, or other data structure to store the information. In some implementations, the datastore 232, or a portion thereof, may be distributed across at least one other device, such as a server, a network storage device, and so forth. As illustrated in FIG. 2, the datastore 232 may include at least one of the access code data 122, the delivery data 126, the description data 130, the attribute data 218, the condition data 224, valuation data 228, presence data 234, receipt data 236, image data 238, weight data 240, identification data 242, alert data 244, or recommendation data 246.

The access code data 122 may comprise information representing an access code entered by the user 116. The locker computing system 118 may user the access code to determine whether to provide access to the storage compartment 112. For example, if the access code is determined to be valid, the locker computing system 118 may cause the storage compartment 112 to change from a locked state to an unlocked state.

The delivery data 126 may comprise information about a requested delivery location for the item 114. For example, the user 116 may enter information indicating a request for the item 114 to be delivered to another locker system 102 located near the user's 116 home. In another example, the user 116 may enter information indicating a request for the item 114 to be delivered directly to the user's 116 home. The requested delivery location may comprise information indicating an address associated with the user's 116 work, an address associated with the user's 116 family members, an address associated with the user's 116 friends, an address associated with the user's 116 neighbors, and so forth. The requested delivery location may be determined based on an address book associated with the user 116. The locker computing system 118 may be configured to present the address book to the user 116. In some implementations, at least one of the locker system 102 and the fulfillment center computing system 104 determines different costs of shipping the item 114 for the different addressed included in the user's 116 address book. The locker system 102 may present these different costs to the user 116, and the user 116 may select which delivery location based on an analysis of the different costs. For example, it may be cheaper to have the item 114 shipped to the user's 116 work when compared to shipping the item 114 to the user's 116 home. The delivery data 126 may comprise information about a date in which the user 116 would like for the item 114 to be delivered to the delivery location 128.

The description data 130 may comprise information that describes the item 114. In some implementations, the user 116 may operate with the user interface module 120 to input the information about the item 114. The description data 130 may include information indicating a purchase price of the item 114. In another example, the description data 130 may include information about the name of the item 114, or the condition of the item 114.

The attribute data 218 may comprise information about a quality or characteristic of the item 114. The attribute data 218 may be determined by the locker computing system 118. For example, the locker computing system 118 may determine at least one of a mass or weight of the item 114, a dimension of the item 114, or a condition of the item 114.

The presence data 234 may comprise information about whether the item 114 is proximate to the locker system 102. The proximity sensor may be configured to generate the presence data 234.

The receipt data 236 may comprise information about the purchase price of the item 114. In one example, the optical reader 206(8) is configured to generate the receipt data 236 by scanning a receipt associated with the item 114.

The image data 238 may comprise an image or video of the item 114. The camera 206(6) may be configured to generate the image data 238. The weight data 240 may comprise information about the mass or weight of the item 114. The scale may be configured to generate the weight data 240. As discussed above, the locker computing system 118 may be configured to identify the item 114 based on the weight of the item 114. The identification data 242 may comprise information about an identification of the item 114. The identification module 220 may be configured to generate the identification data 242. The alert data 244 may comprise information indicative of the determination that the item 114 includes the hazardous substance. The recommendation data 246 may comprise information representative of a recommendation of another item 114 based on the identification data 242.

Figure 3:
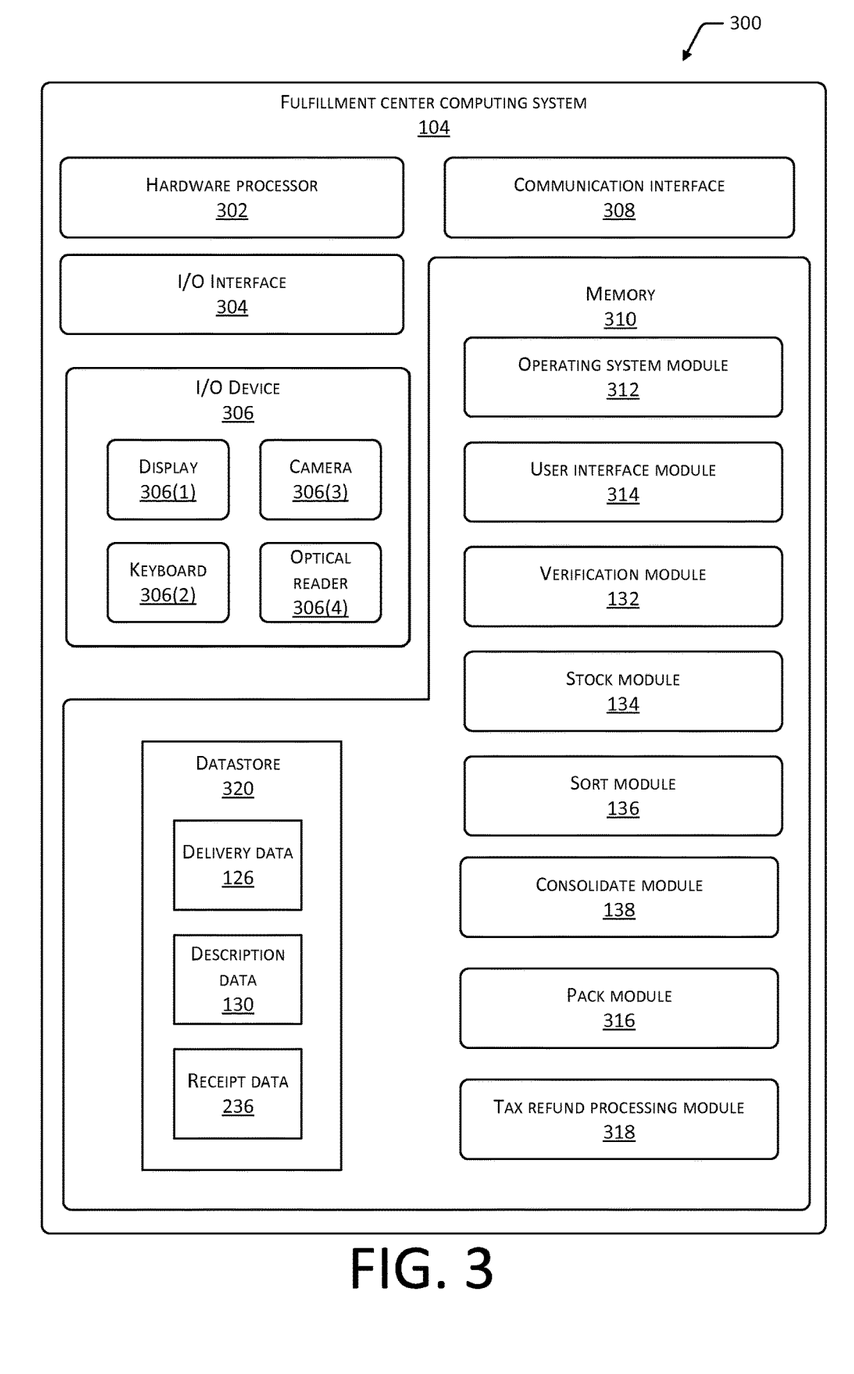
FIG. 3 is a block diagram of the fulfillment center computing system configured to verify that the item corresponds to the description data.

FIG. 3 is a block diagram 300 of the fulfillment center computing system 104 configured to verify that the item 114 corresponds to the description data 130. The fulfillment center computing system 104 may include at least one hardware processor 302 configured to execute stored instructions. The at least one hardware processor 302 (or "processor") may comprise one or more cores.

The fulfillment center computing system 104 includes at least one input/output ("I/O") interface 304 which enables portions of the fulfillment center computing system 104 (e.g., the hardware processor 302) to communicate with other devices. The I/O interface 304 may be configured to implement any number of protocols including I2C, SPI, USB, RS-232, HDMI, TOSLINK, Bluetooth®, and so forth. The at least one I/O interface 304 may be operatively connected to at least one I/O device 306. In some implementations, certain I/O devices 306 are physically incorporated with the fulfillment center computing system 104 or externally placed. The I/O devices 306 may comprise at least one of a display 306(1), a keyboard 306(2), a camera 306(3), or an optical reader 306(4).

The fulfillment center computing system 104 may include at least one communication interface 308. The communication interface 308 may be configured to provide communications between the fulfillment center computing system 104 and other devices, such as the locker computing system 118, routers, access points, servers, other fulfillment center computing systems 104, and so forth. The communication interface 308 may connect to the network.

The fulfillment center computing system 104 may include at least one bus or other internal communications hardware or software that enables for the transfer of data between the various modules and components of the fulfillment center computing system 104.

As illustrated in FIG. 3, the fulfillment center computing system 104 may include at least one memory or memory device 310. The memory 310 may include at least one non-transitory CRSM. The CRSM may include at least one of an electronic storage medium, a magnetic storage medium, an optical storage medium, a quantum storage medium, or a mechanical computer storage medium. The memory 310 may include computer readable instructions, data structures, program modules, and other data for the operation of the fulfillment center computing system 104.

The memory 310 may include at least one OS module 312. The OS module 312 may be configured to manage hardware resources such the I/O interface 304, the I/O devices 306, the communication interface 308, and provide various services to applications or modules executing on the hardware processor 302. The memory 310 may also store at least one of the following modules which may be executed as foreground applications, background tasks, daemons, and so forth.

In some implementations, the memory 310 includes a user interface module 314 configured to provide a user interface to the user 116 using the I/O devices 306 and to accept inputs received from the I/O devices 306. The user interface may include one or more visual, audible, or haptic elements. For example, the user interface may be configured to provide a graphic user interface, an audible user interface, and so forth.

The memory 310 may include the verification module 132 configured to verify that the item 114 corresponds with the description data 130. The item 114 may correspond to the description data 130 if the information of the description data 130 matches or is consistent with the item 114. In one example, while vacationing in India, the user 116 purchases a green spoon for 622 rupees. The word "India" is painted on the green spoon. In this example, the locker system 102 is located in India. The user 116 places the green spoon within the storage compartment 112, and operates with the user interface module 120 to key in information about the green spoon. For example, the user 116 may operate the keyboard 206(3) to input information which indicates: (a) that the item 114 is a spoon; (b) that the color of the item 114 is green; (c) that the word "India" is painted on the spoon; and (d) that the purchase price of the spoon was 622 rupees. In this example, once the user 116 is finished entering in the description of the green spoon, the locker computing system 118 may provide the description data 130 to the fulfillment center computing system 104 using the network described herein. Once the green spoon is delivered to the fulfillment center 108, the verification module 132 may verify that the information included in the description data 130 corresponds to the green spoon. In one example, the verification module 132 is configured to display a message to an inspector of the item 114, requesting that the inspector enter information describing the item 114. The inspector may operate with the user interface module 314 to enter information representing that the item 114 is a green spoon with the word "India" painted on the green spoon. Based on this information, the verification module 132 may determine that the item 114 corresponds to the description data 130. By verifying that the item 114 corresponds to the description data 130, the fulfillment center computing system 104 may perform other services such processing value-added-tax refunds.

In another example, the verification module 132 may be configured to verify whether the item 114 corresponds with the description data 132 based on an analysis of an image of the item 114. Continuing with the example, after the green spoon is delivered to the fulfillment center 108, the camera 306(3) acquires an image of the green spoon. The verification module 132 may be configured to compare the acquired image with the description data 130 which was entered for the green spoon. Based on the comparison, the verification module 132 may determine whether the green spoon corresponds with the description data 130.

The memory 310 may include the stock module 134 configured to cause the item 114 to be stored in inventory.

For example, the stock module 134 may analyze the delivery data 126 entered in for the item 114, and determine that the item 114 is not scheduled for delivery for at least six months. Because the item 114 is not scheduled for delivery until at least six months, the item 114 may be stored in inventory until the item 114 is ready for shipment. In one example, once the stock module 134 determines that the item 114 should be stocked until a future date, the stock module 134 may display a message to an employee working at the fulfillment center 108, indicating that the item 114 should be placed in inventory.

The memory 310 may include the sort module 136 configured to cause the item 114 to be sorted to a designated location of the fulfillment center 108. In one example, the sort module 136 includes a conveyor belt system configured to transport the item 114 from an inventory location to another location where the item 114 is prepared for shipping.

The memory 310 may include the consolidate module 138 configured to cause the item 114 to be consolidated with other items 114 before being delivered to the delivery location 128. In one example, the fulfillment center computing system 104 displays a message to an employee at the fulfillment center 108, indicating a request for the first item 114 to be consolidated with the second item 114. By consolidating the first item 114 with the second item 114, costs associated with shipping the items 114 may be reduced because a fewer number of separate deliveries may be needed to ship the items 114 to the delivery location 128. The first item 114 may be consolidated with the second item 114 by combining the first item 114 and the second item 114 into the same container such as the same box.

The memory 310 may include a pack module 316 configured to cause the item 114 to be packed. The pack module 316 may include a plastic wrapping device configured to wrap the item 114 in film. In another example, the pack module 316 may include a paper wrapping device configured to wrap the item 114 in parcel paper. The pack module 316 may include an automated wrapping, boxing, or bagging machine configured to apply tape, adhesives, shipping labels, or any other covering or tag to an item 114.

The memory 310 may include a tax refund processing module 318 configured to process a tax refund associated with the first item 114. The tax refund may relate to various types of taxes, such as duties associated with customs, sales tax, value-added-tax, and so forth. In one example, the user 116 resides in the United States and is vacationing in a European country. While in Europe, the user 116 purchases a souvenir which is placed within the storage compartment 112 of the locker system 102. When the user 116 purchased the souvenir, the user 116 paid a value-added-tax. In this example, the user 116 is entitled to a refund associated with the paid value-added-tax. The tax refund processing module 318 may be configured to process the value-added-tax refund. In one example, the tax refund processing module 318 credits an account associated with the user 116 once the value-added-tax refund has been successfully processed. The tax refund processing module 318 processes the value-added-tax refund using the receipt data 236 as in input.

In some implementations, the memory 310 includes a datastore 320 for storing information. The datastore 320 may use a flat file, database, linked list, tree, or other data structure to store the information. In some implementations, the datastore 320, or a portion thereof, may be distributed across at least one other device, such as a server, a network storage device, and so forth. As illustrated in FIG. 3, the datastore 320 may include at least one of the delivery data 126, the description data 130, or the receipt data 236. In some implementations, the locker computing system 118 provides the delivery data 126, the description data 130, and the receipt data 236 using the network.

Figure 4:
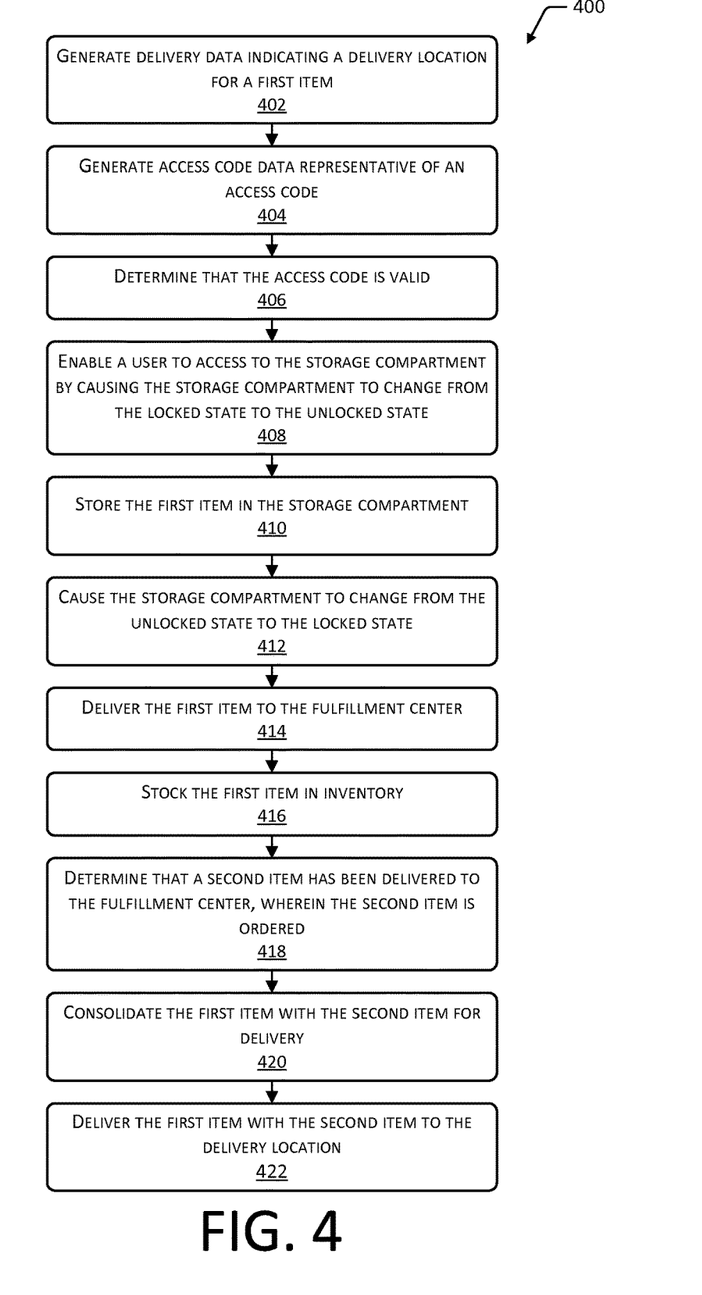
FIG. 4 is a flow diagram illustrating a process of consolidating, at a fulfillment center, an item delivered from a locker system with a second item ordered by the user, and delivery the item with the second item.

FIG. 4 is a flow diagram 400 illustrating a process of consolidating, at a fulfillment center 108, the item 114 with a second item 114 ordered by the user 116, and delivering the item 114 with the second item 114. The fulfillment center computing system 104 and the locker computing system 118 may implement the process 400. Although the process 400 is described with reference to the flowchart illustrated in FIG. 4, many other methods performing the acts associated with the process 400 may be used. For example, the order of many of the steps may be changed, some of the steps described may be optional, and additional steps may be included.

At block 402, the locker computing system 118 generates the delivery data 126 comprising information about the delivery location 128 for a first item 114. For example, the user 116 may operate with the user interface module 120 to enter delivery information. The user 116 may specify an address associated with the delivery location 128, and a date in which the user 116 would like the item 114 to be delivered. Based on the entered information by the user 116, the locker computing system 118 may generate the delivery data 126 representative of the entered delivery information.

At block 404, the locker computing system 118 generates the access code data 122 comprising information representative of a series of characters or digits. In some implementations, at least one of the fulfillment center computing system 104 or the locker computing system 118 provides the access code to a computing device controlled by the user 116 in response to receiving a request from the user's 116 computing device. Once the user 116 has the access code, the user 116 may operate with the user interface module 120 to enter the access code. Based on the entered access code, the locker computing system 118 may generate the access code data 122 which is representative of the entered access code.

At block 406, the locker computing system 118 determines that the access code data 122 is valid. In one example, the locker computing system 118 determines that the access code data 122 is valid in response to a determination that the access code matches one or more codes stored in a database.

At block 408, the locker computing system 118 enables the user 116 to access to the storage compartment 112 by causing the storage compartment 112 to change from the locked state to the unlocked state. The locker computing system 118 may cause the storage compartment 112 to change from the locked state to the unlocked state in response to a determination that the access code is valid.

At block 410, the first item 114 is stored in the storage compartment 112. In one example, while travelling in New Orleans, the user 116 purchases a trinket. The user 116 places the trinket into the storage compartment 112 and closes the door of the storage compartment 112, which results in the storage compartment 112 storing the trinket.

At block 412, the locker computing system 118 causes the storage compartment 112 to change from the unlocked state to the locked state. The storage compartment 112 may change from the unlocked state to the locked state after the item 114 is placed into the storage compartment 112 and the door of the storage compartment 112 is closed.

At block 414, the first item 114 is delivered to the fulfillment center 108. In one example, a carrier may remove the item 114 from the storage compartment 112 and deliver the item 114 to the fulfillment center 108.

At block 416, the fulfillment center computing system 104 causes the first item 114 to be stocked in inventory. In one example, the fulfillment center computing system 104 displays a message to an employee of the fulfillment center 108, indicating that the first item 114 should be stocked in inventory because the user 116 has requested that the first item 114 be delivered at a future date.

At block 418, the fulfillment center computing system 104 determines that a second item 114 has been delivered to the fulfillment center 108. In this implementation, the second item 114 is ordered by the user 116. For example, the user 116 may have ordered a book from the electronic marketplace. In this example, the book comprises the second item 114. The book may be located at a warehouse far from the fulfillment center location 110. The book may be delivered from the warehouse to the fulfillment center 108. Once the book arrives at the fulfillment center 108, the fulfillment center computing system 104 may generate data indicating that the book has arrived at the fulfillment center 108.

At block 420, the fulfillment center computing system 104 causes the first item 114 to be consolidated with the second item 114 for delivery. In one example, the fulfillment center computing system 104 displays a message to an employee of the fulfillment center 108, indicating a request for the first item 114 to be consolidated with the second item 114. By consolidating the first item 114 with the second item 114, costs associated with shipping the items 114 may be reduced because a fewer number of separate deliveries may be needed to ship the items 114 to the delivery location 128. The first item 114 may be consolidated with the second item 114 by combining the first item 114 and the second item 114 into the same container such as the same box.

At block 422, the first item 114 is delivered to the delivery location 128 with the second item 114. In one example, the first item 114 and the second item 114 are consolidated into a single package. A carrier may deliver the single package, and drop off the single package at the delivery location 128 specified within the delivery data 126.

Figure 5:
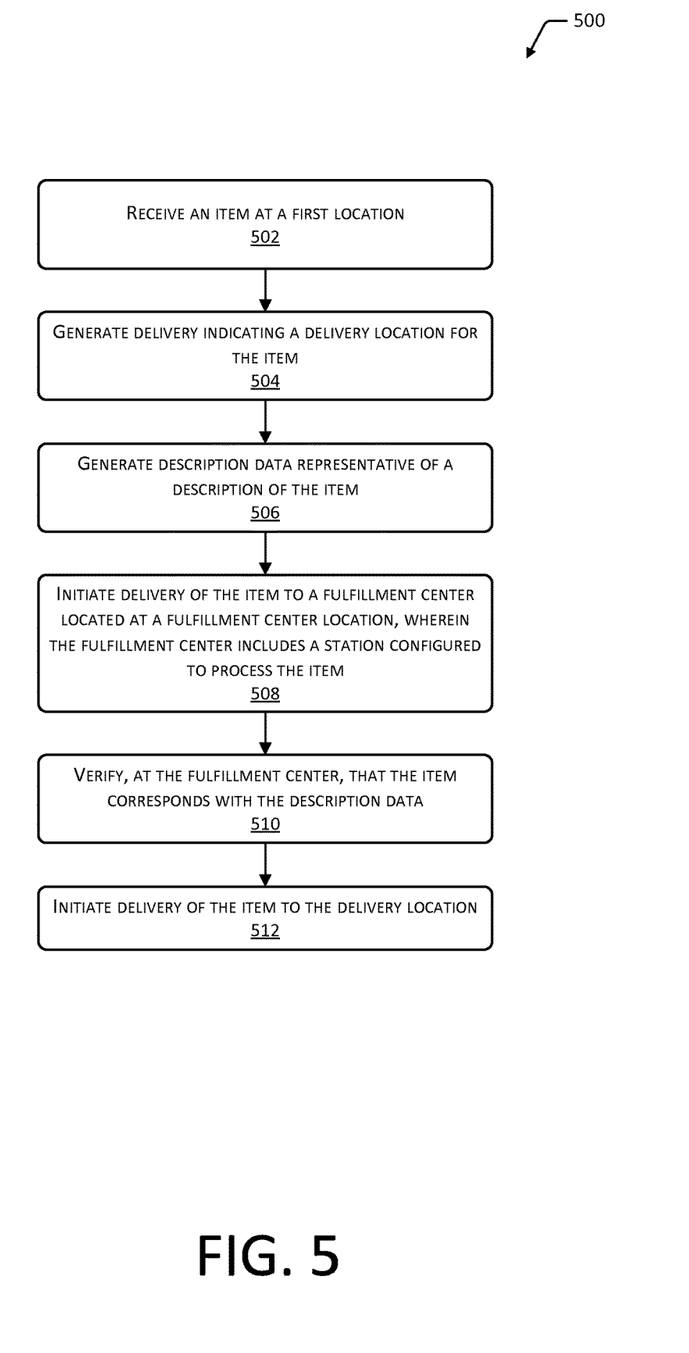
FIG. 5 is a flow diagram illustrating a process of verifying that the item received at the fulfillment center corresponds with the description data.

FIG. 5 is a flow diagram 500 illustrating a process of verifying that the item 114 received at the fulfillment center 108 corresponds with the description data 130. The fulfillment center computing system 104 and the locker computing system 118 may implement the process 500. Although the process 500 is described with reference to the flowchart illustrated in FIG. 5, many other methods performing the acts associated with the process 500 may be used. For example, the order of many of the steps may be changed, some of the steps described may be optional, and additional steps may be included.

At 502, the locker system 102 receives the item 114 at a first location. For example, an entity such as the user 116 may place a purchased souvenir into the storage compartment 112, resulting in the locker system 102 receiving the item 114.

At 504, the locker computing system 118 generates the delivery data 126 comprising information about a delivery location 128 for the item 114. For example, the user 116 may operate with the user interface module 120 and enter an address of the delivery location 128. The delivery data 126 may comprise information representative of the entered address.

At 506, the locker computing system 118 generates the description data 130 comprising information about a description of the item 114. For example, the user 116 may operate the user interface module 120 and enter a purchase price of the item 114. The description data 130 may comprise information representative of the purchase price of the item 114.

At 508, the locker computing system 118 initiates delivery of the item 114 to the fulfillment center 108 located at the fulfillment center location 110. In this implementation, the fulfillment center 108 includes stations configured to process the item 114. In one example, the locker computing system 118 may provide data to a computing device associated with a carrier, indicating that the item 114 is ready to be picked up and delivered to the fulfillment center 108. The carrier may remove the item 114 from the storage compartment 112 and deliver the item 114 to the fulfillment center 108 located at the fulfillment center location 110.

At 510, the fulfillment center computing system 104 verifies, at the fulfillment center 108, that the item 114 corresponds with the description data 130. In one example, the user 116 purchases a trinket while travelling on vacation for ten dollars. The user 116 places the trinket in the storage compartment 112, and operates the user interface module 120 to enter the purchase price information of the trinket. The locker computing system 118 generates the description data 130 which comprises information representative of the ten dollar purchase price. The locker computing system 118 provides the description data 130 to the fulfillment center computing system 104 using the network. At the fulfillment center 108, the fulfillment center computing system 104 verifies that the item 114 corresponds with the ten dollar purchase price. The fulfillment center computing system 104 may verify that the item 114 corresponds with the ten dollar purchase by identifying the item 114 and comparing the item 114 with a predetermined value associated with the item 114.

By verifying the item 114 at the fulfillment center 108, the fulfillment center 108 may provide additional services, such as processing tax refunds including value-added-tax refunds. For example, the optical reader 206(8) may be configured to scan a receipt associated with the item 114. The receipt may include information indicating that a particular item 114 was purchased for one hundred euros and included a fifteen euro value-added-tax. The locker computing system 118 may generate receipt data 236 comprising information indicating that the particular item 114 was purchased for one hundred euros. The locker computing system 118 may provide the receipt data 236 to the fulfillment center computing system 104. Based on the receipt data 236, the fulfillment center computing system 104 may process a value-added-tax refund.

At 512, the locker computing system 118 initiates delivery of the item 114 to the delivery location 128. In one example, the locker computing system 118 provides data to a computing device associated with a carrier, indicating that that the item 114 is ready to be picked up and delivered to the delivery location 128. The carrier picks up the item 114 at the fulfillment center 108 and delivers it to the delivery location 128. In another example, the locker computing system 118 may initiate delivery of the item 114 to the delivery location 128 by causing a forklift to carry the item 114 and remove the item 114 from inventory such that the item 114 may be delivered by the carrier.

In some implementations, the locker computing system 118 causes the item 114 to be consolidated for delivery with a second item 114. The second item 114 may be received from an entity different from the first item 114. For example, the first item may be received from a first entity such the user 116, and the second item may be received from a second entity such as a wholesaler.

In some implementations, the locker computing system 118 may generate the condition data 224 comprising information about a condition associated with the item 114. For example, the locker computing system 118 may include the camera 206(6) configured to generate the image data 238. The locker computing system 118 may generate the attribute data 218 by analyzing the image data 238. The attribute data 218 may comprise information about a characteristic of the item 114. For example, the characteristic may include a weight or dimension of the item. The locker computing system 118 may generate the condition data 224 by analyzing the attribute data 218. In one example, the condition data 224 indicates that the item 114 is in fair condition. The locker computing system 118 may be configured to offer insurance based on the condition of the item 114.

In some implementations, the locker computing system 118 is configured to offer a replacement item. The locker computing system 118 may determine that the condition of the item 114 is at or below a threshold level. In response to the determination that the condition of the item 114 is at or below the threshold level, the locker computing system 118 may be configure to offer a replacement item. The replacement item may be ordered using the electronic marketplace. In some implementations, once the item 114 is identified at the locker system 102, the locker computing system 118 is configured to offer an upgrade. The upgrade may comprise a newer or an improved version of the identified item 114.

In some implementations, the fulfillment center computing system 104 is configured to cause the item 114 to be delivered to the delivery location 128 at a requested date. For example, the delivery data 126 may comprise information about a date representative of the a requested date for the item 114 to be delivered to the delivery location 128. In this example, the requested date is twenty-four weeks from today. Once the item 114 is delivered from the locker system 102 to the fulfillment center 108, the fulfillment center computing system 104 causes the item 114 to be stocked in inventory at the fulfillment center 108. At a predetermined date before the requested date, the fulfillment center computing system 104 causes the item 114 to be removed from inventory. Continuing with the example, twenty-three weeks from today, the fulfillment center computing system 104 may display a message to an employee working at the fulfillment center 108, indicating the need for the item 114 to be removed or picked from the inventory so that the item 114 may be delivered on the requested date.

In some implementations, the fulfillment center computing system 104 is configured to provide recommendations to a user 116 based on the item 114. For example, based on information acquired by the camera 206(6), the locker computing system 118 may be configured to generate the identification data 242 comprising information about an identification of the item 114. Once the item 114 has been identified, the locker computing system 118 may be configured to generate the recommendation data 246 using the identification data 242.

In some implementations, the locker computing system 118 is configured to determine whether the item 114 includes a hazardous substance. In response to a determination that the item 114 includes the hazardous substance, the locker computing system 118 may generate the alert data 244 comprising information indicative of the determination that the item 114 includes the hazardous substance. The computing system 118 may be configured to provide the alert data 244 to authorities such as the police.

The fulfillment center computing system 104 may be configured to determine whether or not to stock the item 114 in inventory. For example, the fulfillment center computing system 104 may determine that delivering the item 114 to the delivery location 128 would be cheaper than to stock the item 114 in inventory. Because it would be cheaper to deliver the item 114 to the delivery location 128, the fulfillment center computing system 104 may be configured to immediately initiate the delivery process, and skip the stocking process.

The fulfillment center computing system 104 may be configured to store the item 114 until a user 116 specified date of delivery. An entity associated with the fulfillment center 108 may charge the user 116 for storing the item 114.

Figure 6:
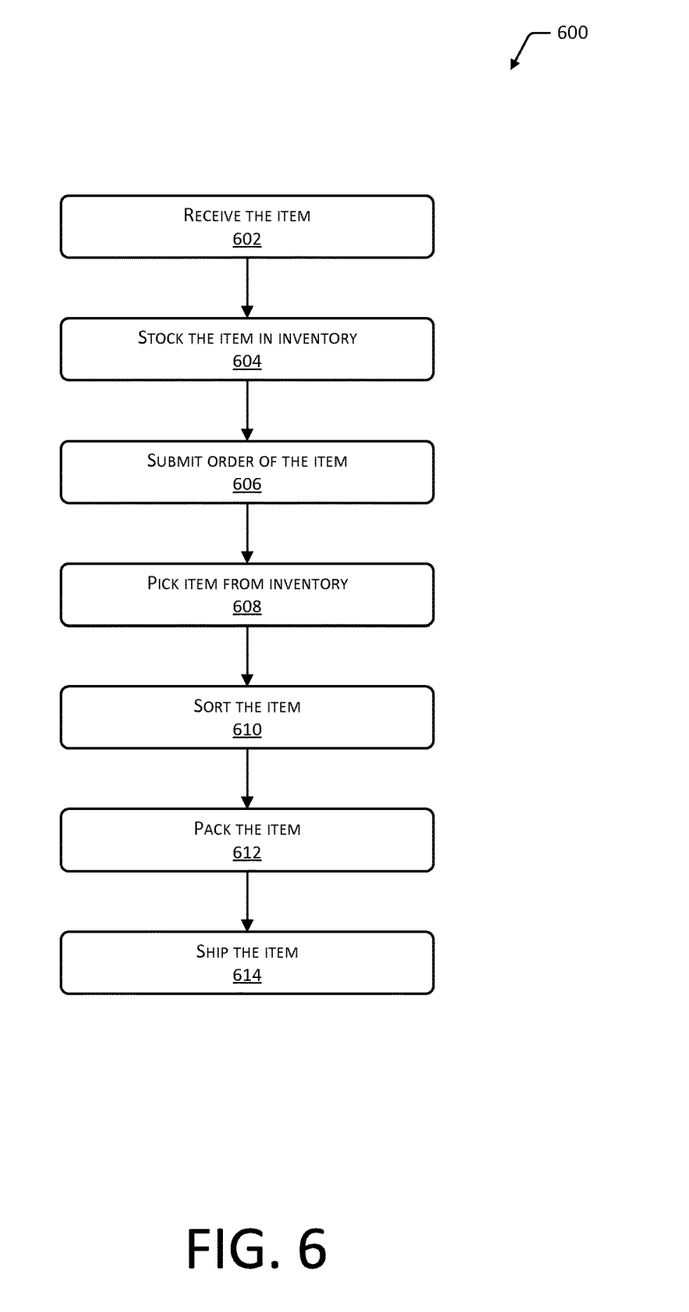
FIG. 6 is a flow diagram illustrating example processes performed at the fulfillment center.

FIG. 6 is a flow diagram 600 illustrating example processes performed at the fulfillment center 108. Although the process 600 is described with reference to the flowchart illustrated in FIG. 6, many other methods performing the acts associated with the process 600 may be used. For example, the order of many of the steps may be changed, some of the steps described may be optional, and additional steps may be included.

At 602, the fulfillment center 108 receives the item 114. The fulfillment center 108 may comprise one or more facilities that process, store, and distribute the items 114. The fulfillment center 108 may comprise at least one of warehouses, distribution centers, hubs, nodes in a supply chain network, retail establishments, shipping facilities, stock storage facilities, or any other facility configured to process the items 114. In some implementations, the fulfillment center 108 comprises a location (e.g., a parking lot) where the items 114 may be transferred between vehicles. The fulfillment center 108 may be associated with an electronic marketplace. The electronic marketplace may comprise a virtual market for buyers and sellers implemented through the Internet or the World Wide Web. When a buyer places an order for an item 114 using the electronic marketplace, the item 114 may be delivered to the buyer in any corner of the globe, and by any known transportation means, including ground, sea, or air transit.

At 604, the item 114 is stocked in inventory. At 606, an order of the item 114 is submitted. The orders may specify one more items 114 to be shipped from the inventory to a specified delivery location 128.

At 608, the item 114 is picked from the inventory. In one example, an employee of an entity which operates the fulfillment center 108 removes the item 114 from inventory and places the item 114 on conveyor belt system.

At 610, the item 114 is sorted. In one example, a conveyor belt system is configured to sort the item 114, and cause the item 114 to be placed at a designated station within the fulfillment center 108 for packaging.

At 612, the item 114 is packed. In one example, an automated boxing or bagging machine is configured to apply tape, adhesives, shipping labels, or any other covering or tag to an item 114.

At 614, the item 114 is shipped. For example, a carrier may remove the packaged item 114 and deliver the packaged item 114 to the delivery location 128.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A method comprising:
   receiving a first item at a first location;
   generating, with an input device, delivery data indicating a delivery location for the first item and a requested delivery date on which a user requests the first item to be delivered to the delivery location;
   generating, with the input device, description data representative of a description of the first item;
   initiating delivery of the first item to a fulfillment center located at a second location;
   verifying based on first data obtained by a first device at the fulfillment center that the first item corresponds with the description data;
   causing the first item to be stocked in inventory at the fulfillment center;
   determining based on second data obtained by the first device at the fulfillment center that a second item has been delivered to the fulfillment center;
   at a predetermined date before the requested delivery date, causing the first item to be removed from the inventory;
   causing the first item and the second item to be consolidated for delivery; and
   initiating delivery of the first item and the second item to be delivered to the delivery location by the requested delivery date.

2. The method of claim 1, wherein receiving the first item at the first location includes securing the first item in a storage compartment located at the first location.

3. The method of claim 1, wherein:
   accessing image data generated by a camera;
   generating attribute data by analyzing the image data, the attribute data indicating a characteristic of the first item; and
   generating condition data by analyzing the attribute data, the condition data indicating a condition associated with the first item.

4. The method of claim 1, wherein:
   generating attribute data indicating a characteristic of the first item, the characteristic comprising information about at least one of:
      a mass or weight of the item, or
      a dimension of the first item;
   generating condition data by analyzing the attribute data, the condition data indicating a condition of the first item;
   offering insurance based on the condition of the first item; and
   offering to add the first item to a homeowner's or renter's policy.

5. The method of claim 1, wherein:
   generating attribute data indicating a characteristic of the first item;
   generating condition data by analyzing the attribute data, the condition data indicating a condition associated with the first item, the condition comprising at least one of new, unused, mint in box, like new, excellent, good, fair, bargain grade, and poor;
   determining that the condition is at or below a threshold level; and
   offering a replacement item based on the condition of the first item.

6. The method of claim 1, further comprising:
   generating identification data indicating an identification of the first item, wherein the first item is identified by analyzing an image of the first item, the image being acquired by a camera located at a locker system; and
   providing recommendation data indicating a recommendation of another item based on the identification data.

7. The method of claim 1, wherein:
   the receiving the first item at the first location includes securing the first item in a storage compartment located at the first location; and
   the delivery location comprises one or more of a place in which a second user resides or another locker system located within a distance of the place in which the second user resides.

8. The method of claim 1, further comprising:
   wrapping, using an automated wrapping device, the first item with wrapping paper at the fulfillment center; and
   applying a shipping label to the first item after the first item has been wrapped.

9. The method of claim 1, further comprising:
   determining, using a particulate sensor, that the first item includes a hazardous substance; and
   providing alert data indicating the occurrence of the determination that the first item includes the hazardous substance.

10. The method of claim 1, further comprising:
    generating access code data representative of an access code;

determining that the access code data is valid by comparing the access code with another access code received from the fulfillment center computing system; and causing a storage compartment located at the first location to change from a locked state to an unlocked state.

11. The method of claim 1, further comprising determining to deliver the first item in response to a determination that the fulfillment center is scheduled to fulfill an order of the second item.

12. A system comprising:
a memory storing computer-executable instructions; and
a hardware processor configured to execute the computer-executable instructions to:
receive, from a user, a first item at a first location;
generate delivery data indicating a delivery location for the first item and a requested delivery date on which the user requests the first item to be delivered to the delivery location;
generate description data representative of a description of the first item;
generate first instructions that deliver the first item to a fulfillment center located at a second location;
generate second instructions that store the first item at the fulfillment center;
at a predetermined date before the requested delivery date, generate third instructions that remove the first item from inventory;
generate fourth instructions that consolidate the first item and a second item for delivery; and
generate fifth instructions that initiate delivery of the first item and the second item to be delivered to the delivery location by the requested delivery date.

13. The system of claim 12, further comprising computer-executable instructions to:
access image data generated by a camera at the first location; and
generate, based on the image data, condition data indicative of a quality grading of the first item.

14. The system of claim 12, further comprising computer-executable instructions to:
generate receipt data indicative of a purchase price of the first item and date of purchase of the first item; and
determine a tax refund based on the receipt data.

15. The system of claim 12, further comprising computer-executable instructions to:
receive an order from the user for the second item; and
wherein the delivery location comprises a place in which the user resides.

16. A system comprising:
a memory storing computer-executable instructions; and
a hardware processor configured to execute the computer-executable instructions to:
receive data indicative of receipt of a first item at a first location;
receive delivery data indicating a delivery location for the first item and a requested delivery date on which a user requests the first item to be delivered to the delivery location;
generate description data representative of a description of the first item;
generate first instructions that deliver the first item to a fulfillment center located at a second location;
generate second instructions that store the first item at the fulfillment center;
at a predetermined date before the requested delivery date, generate third instructions that remove the first item from inventory; and
generate fourth instructions that initiate delivery of the first item and a second item to be delivered to the delivery location by the requested delivery date.

17. The system of claim 16, further comprising computer-executable instructions to:
generate fifth instructions that fulfill, at the fulfillment center, an order from the user for the second item; and
generate sixth instructions that consolidate the first item and the second item for delivery.

18. The system of claim 16, further comprising computer-executable instructions to:
determine data indicative of a purchase price of the first item; and
determine, based at least in part on the second location and the purchase price, a tax refund.

19. The system of claim 16, further comprising one or more sensors; and further computer-executable instructions to:
determine, using the one or more sensors, that the first item includes one or more of a hazardous or banned substance; and
generate alert data.

20. The system of claim 16, further comprising computer-executable instructions to:
determine that the second item has been delivered to the fulfillment center; and
consolidate the first item and the second item for delivery; and
wherein the initiating delivery further includes the second item.

* * * * *